United States Patent [19]

Heffler

[11] 4,091,177
[45] May 23, 1978

[54] GAS DIFFUSION ELECTRODES FOR ELECTROCHEMICAL CELLS WITH ACID ELECTROLYTES

[75] Inventor: Jochen Heffler, Grossauheim, Germany

[73] Assignee: Licentia Patent-Verwaltungs-G.m.b.H., Germany

[21] Appl. No.: 749,663

[22] Filed: Dec. 13, 1976

[30] Foreign Application Priority Data

Dec. 17, 1975 Germany ............................ 2556731

[51] Int. Cl.² .................... H01M 4/86; H01M 4/92
[52] U.S. Cl. ............................................................ 429/42
[58] Field of Search .................................. 429/42, 27

[56] References Cited

U.S. PATENT DOCUMENTS

| 3,276,909 | 10/1966 | Moos | 429/42 |
| 3,457,113 | 7/1969 | Deibert | 429/42 |
| 3,553,022 | 1/1971 | Gregory | 429/42 |
| 3,733,221 | 5/1973 | Sandler | 429/42 |

Primary Examiner—John H. Mack
Assistant Examiner—H. A. Feeley
Attorney, Agent, or Firm—McGlew and Tuttle

[57] ABSTRACT

A gas diffusion electrode for electrochemical cells with acid electrolytes, comprises a hydrophobic layer of gas permeable electrically conductive material having up to 0.2 mm of thickness and having pores with a most frequent pore diameter of about 1.8 microns, and a hydrophilic layer containing a catalyst which is closely bonded to the hydrophobic layer. The hydrophilic layer has pores with a most frequent pore diameter of 0.08 microns.

5 Claims, 2 Drawing Figures

GAS DIFFUSION ELECTRODES FOR ELECTROCHEMICAL CELLS WITH ACID ELECTROLYTES

BACKGROUND OF THE INVENTION

1. Field of the Invention

This invention relates in general to the construction of electrodes and in particular to a gas diffusion electrode for electrochemical cells with acid electrolytes which comprises a hydrophobic layer of gas permeable electrically conductive material and a hydrophilic layer containing a catalyst closely bonded to the hydrophilic layer.

2. Description of the Prior Art

The invention relates particularly to a gas diffusion electrode for electrochemical cells with acid electrolytes, preferably a cathode for air-operation. In electrochemical cells with acid electrolytes, air can be used as a cheap oxidant, without the necessity for an elaborate purification of the air, as it is necessary in alkaline cells. The corresponding air electrodes (cathodes) can be disigned as gas diffusion electrodes.

In the operation of these electrodes under air (20% oxygen) with normal climate-related humidity, there is a considerable voltage drop, compared to the operation with pure oxygen. The resulting power drop can not be sufficiently reduced by artificial liquidification of the air supplied to the electrodes. Besides, this requires an additional engineering effort. Furthermore, the cell voltage builds up to a stationary value in load variations with a relatively large time constant.

SUMMARY OF THE INVENTION

The invention is based on the problem of considerably reducing the power drop in the operation of the electrode under air, and in maintaining it independent of the humidity of the air. Finally, the cell voltage is to build up to a stationary value in load variations with a relatively small time constant.

According to the invention a hydrophobic, gas-permeable and electrically conductive layer of up to 0.2 mm thickness with a most frequent pore diameter of about 1.8 mm is closely bonded with a hydrophilic layer of about 0.3 mu thickness containing the catalyst, which has a most frequent pore diameter of 0.08 mu m.

The advantages achieved by the invention consist particularly in a low power loss, compared to pure oxygen operation, in a power independent of the humidity of the air, and in quick setting times of the load potentials.

Accordingly it is an object of the invention to provide a gas diffusion electrode for electrochemical cells with acid electrolytes which comprises a hydrophobic layer of a gas permeable electrically conductive material having a thickness of up to 0.2 mm and having pores with a most frequent pore diameter of about 1.8 microns and which is closely bonded to a hydrophilic layer containing a catalyst and which has pores with a most frequent pore diameter of 0.08 mu m.

A further object of the invention is to provide a gas diffusion electrode which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
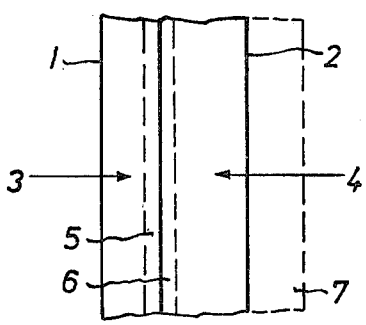
FIG. 1 is a schematic representation of a construction of a cathode electrode constructed in accordance with the invention.

Referring to the drawings in particular the invention embodied therein in FIG. 1 comprises an electrode with a hydrophobic gas-conducting layer 1 comprising hard coal and polytetrafluorethylene with a particle size of 10 to 25 microns and a most frequent pore diameter of about 1.8 microns, and a hydrophilic working layer 2 consisting of activated carbon doped with Pt, with a particle size of 0.5 microns and a most frequent pore diameter 0.08 microns. The thickness of layer 1 is about 0.2 mm and that of layer 2 is about 0.3 mm.

The gas-conducting layer 1 is supplied with air and the working layer 2 with an acid electrolyte 4. The phase boundary electrolyte/air is designated with 5, and the connecting zone with 6.

For the production of the gas-conducting layer 1, about 45 g of hard coal powder with a particle size of about 10 to 25 microns are stirred with about 50% by weight polytetrafluorethylene in the form of a suspension in 250 ml hexane. Subsequently the mixture is filtered off and washed out thoroughly with 100 ml hexane and 200 ml acetone to form a moist pulp which is pressed in a filter press mold to a compact solid body (size of layer about 100 cm$^2$, thickness 5 mm). Skins of about 1 mm are cut from this solid body, and the skins are rolled down to about 0.4 mm thickness. The selected grain fraction of the hard coal powder represents the optimum between the opposing parameters of electric conductivity and permeability, on the one hand, and hydrophobic behavior, on the other hand.

For the production of the working layer 2 containing the cayalyst about 35 g activated carbon powder with a particle size of 0.5 microns and the applied platinum catalyst, amounting to about 10% by weight, are stirred with about 18% by weight polytetrafluorethylene and about 17% by weight polyethylene in 200 ml hexane and filtered off. The pulp is pressed in a filter press mold to a compact solid body with a layer size of 100 cm$^2$, for example, and a thickness of 20 mm, and from this body are cut skins of about 1 mm thickness which are rolled down to a thickness of about 0.6 mm.

Then the two pre-rolled layers are superposed and rolled together to a final thickness of about 0.5 mm. The electrode thus formed is sintered under nitrogen for about 30 minutes at 165° C and under a pressure of 100 p/cm$^2$.

Due to the good permeability of the hydrophobic gas-conducting layer, 1 of $6.10^{-4}$ cm$^2$/s and the low thickness of 0.2 mm, the nitrogen not reacted during the loading is rinsed loose from connecting zone 6 in which the oxygen is absorbed, and it arrives in the active centers at the pore edges without much hindrance, due to the small pore diameter of 0.08 mu m of the electrolytefilled working layer 2. The low thickness 0.3 mm of this layer 2 insures a rapid elimination of the reaction partners $H^+$-ions and water.

As indicated in frame 1 in broken lines, an additional porous and hydrophilic layer 7 of up to 0.2 mm thickness can be rolled on working layer 2, which is non-conductive for electrons. This additional layer has a most frequent pore diameter of about 5 microns; as a starting material for this layer can be used $Al_2O_3$ powder, $BaSO_4$ powder, etc. in connection with polyethylene or polystyrene. The layer acts as an electrolyte storage and as an electronically insulating separator to the cathode. This additional layer 7 eliminates the necessity of repumping the electrolyte.

Figure 2:
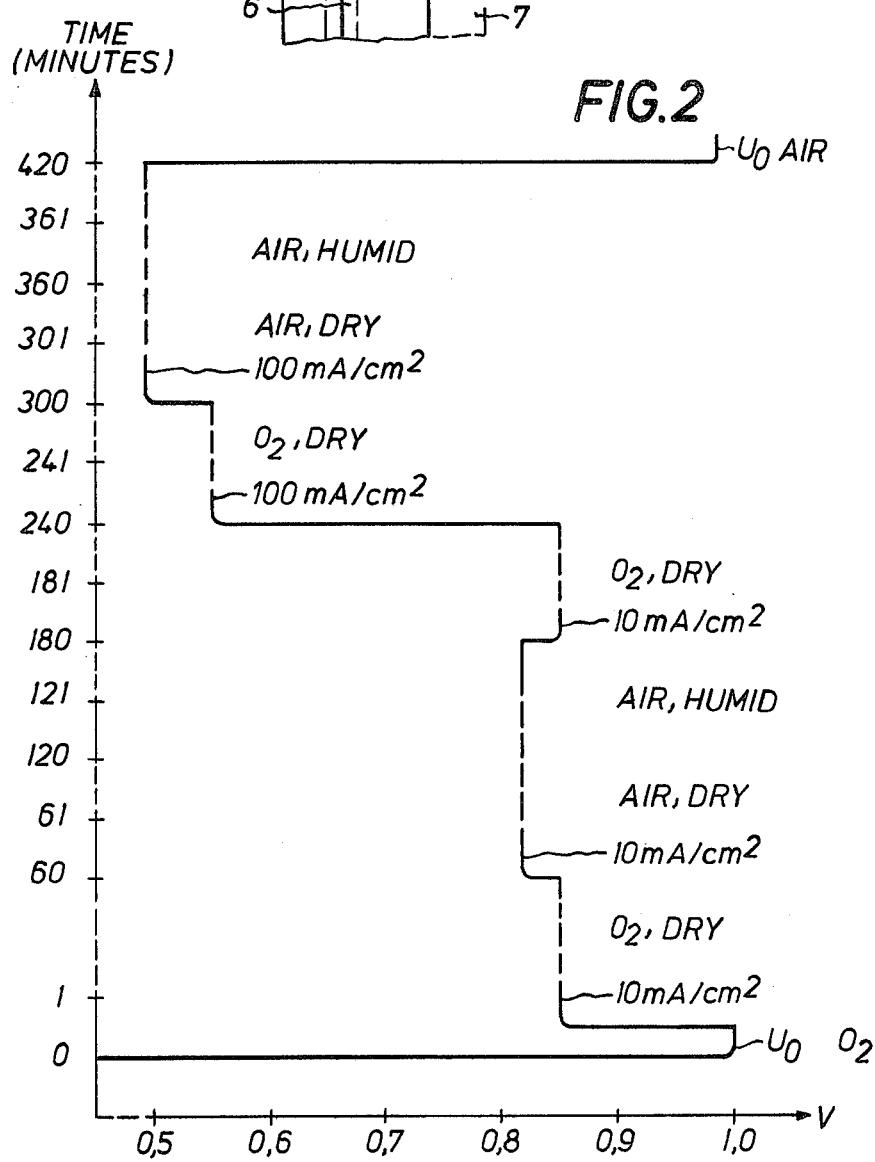
FIG. 2 shows a curve of the variations of cell voltages over periods of operating time indicating the time slope of the cell voltage under different conditions obtained with the use of the electrode.

FIG. 2 shows the time slope of the cell voltage under oxygen and air operation, with and without wetting of the gases. There is no potential difference between dry and humid air either under weak or under heavy load. The potential drop when changing from oxygen operation to air operation is not more than 30 mV in an idle run under weak load, and not more than 60 mV under heavy load.

As seen from the diagram, the cell voltage $U_H$ is 1 volt at the time 0 in oxygen operation, dry. It is assumed that a load of 10 mA qcm is applied after 2.5 minutes, so that the cell voltage drops within about 15 seconds to 0.85 V. It is also assumed that the operation is changed to air dry after 60 minutes under the same load of 10 mA/qcm, so that the cell voltage assumed within 15 seconds a value of 0.82 V; this value does not change with humid air.

If we change again after 180 minutes to oxygen operation, dry, we obtain again, within 15 seconds, a cell voltage of 0.85 V. When the load is increased after 240 minutes to 100 mA/qcm, the cell voltage drops within about 15 seconds to 0.55 V and, after changing to air operation dry or humid, the cell voltage drops after 300 minutes within 15 seconds to 0.49 V. If the load is removed after 420 minutes, the cell voltage rises in air operation within about 15 seconds to about 0.98 V.

While a specific embodiment of the invention has been shown and described in detail to illustrate the application of the principles of the invention, it will be understood that the invention may be embodied otherwise without departing from such principles.

What is claimed is:

1. A gas diffusion electrode for electrochemical cells with acid electrolytes, comprising a hydrophobic layer of gas permeable electrically conductive material having a thickness of up to 0.2 mm and having pores with a most frequent pore diameter of about 1.8 microns, and a hydrophilic layer containing a catalyst closely bonded to said hydrophobic layer and having pores with a most frequent pore diameter of 0.08 microns.

2. Gas diffusion electrode according to claim 1, including a second hydrophilic, electrolyte-storing layer with a most frequent pore diameter of about 5 microns and which is not conductive for electrons, bonded with said hydrophilic layer containing the catalyst.

3. Gas diffusion electrode according to claim 1, wherein said hydrophilic layer being the catalyst includes a platinum-doped activated carbon forming an air cathode in said hydrophilic layer containing the catalyst.

4. Gas diffusion electrode according to claim 1, said hydrophilic layer including an acid-resistant and hydrophilic plastic.

5. Gas diffusion electrode acording to claim 1, wherein said hydrophobic and said hydrophilic layers comprise individual prerolled layers of double their final thickness, which are then superposed and rolled to their final thickness.

* * * * *